US011243099B2

United States Patent
Nie et al.

(10) Patent No.: US 11,243,099 B2
(45) Date of Patent: Feb. 8, 2022

(54) LIGHTNING PROOF SENSOR

(71) Applicant: FATRI (Xiamen) Technologies, Co., Ltd., Xiamen (CN)

(72) Inventors: Yongzhong Nie, Xiamen (CN); Chengxu Luo, Xiamen (CN)

(73) Assignee: FATRI UNITED TESTING & CONTROL (QUANZHOU) TECHNOLOGIES CO., LTD., Quanzhou (CN)

( * ) Notice: Subject to any disclaimer, the term of this patent is extended or adjusted under 35 U.S.C. 154(b) by 0 days.

(21) Appl. No.: 16/847,986

(22) Filed: Apr. 14, 2020

(65) Prior Publication Data

US 2021/0018344 A1  Jan. 21, 2021

(30) Foreign Application Priority Data

Jul. 19, 2019  (CN) .......................... 201921144359.0

(51) Int. Cl.
*G01D 11/24* (2006.01)
*H02H 9/04* (2006.01)

(52) U.S. Cl.
CPC ........... *G01D 11/245* (2013.01); *H02H 9/044* (2013.01)

(58) Field of Classification Search
CPC ............................ H02H 9/044; G01D 11/245
See application file for complete search history.

(56) References Cited

U.S. PATENT DOCUMENTS

2021/0011050 A1 * 1/2021 Nie .................... H01L 41/0533

FOREIGN PATENT DOCUMENTS

| CN | 204142264 U | * | 2/2015 |
| CN | 204142264 U |   | 2/2015 |
| CN | 208656625 U | * | 3/2019 |

* cited by examiner

*Primary Examiner* — Jamel E Williams
(74) *Attorney, Agent, or Firm* — Amster, Rothstein & Ebenstein LLP

(57) ABSTRACT

The application relates to the technical field of sensors, in particular to a lightning proof sensor comprising a sensor housing, a signal generation assembly, a PIN needle and a shielding case. The sensor housing has a cavity; a signal generation assembly is disposed in the cavity and forms insulation contact with an inner wall of the sensor housing; a PIN needle is disposed on the connector on one end of the sensor, and electrically connected with the signal generation assembly; and the shielding case is installed between the signal generation assembly and the sensor housing and covers the signal generation assembly, and the shielding case forms insulation contact with the signal generation assembly and the sensor housing. The sensor provided by the application has better lightning proof performance, and can simultaneously detect two parameters comprising temperature and acceleration speed, so that it has better environmental adaptability.

16 Claims, 1 Drawing Sheet

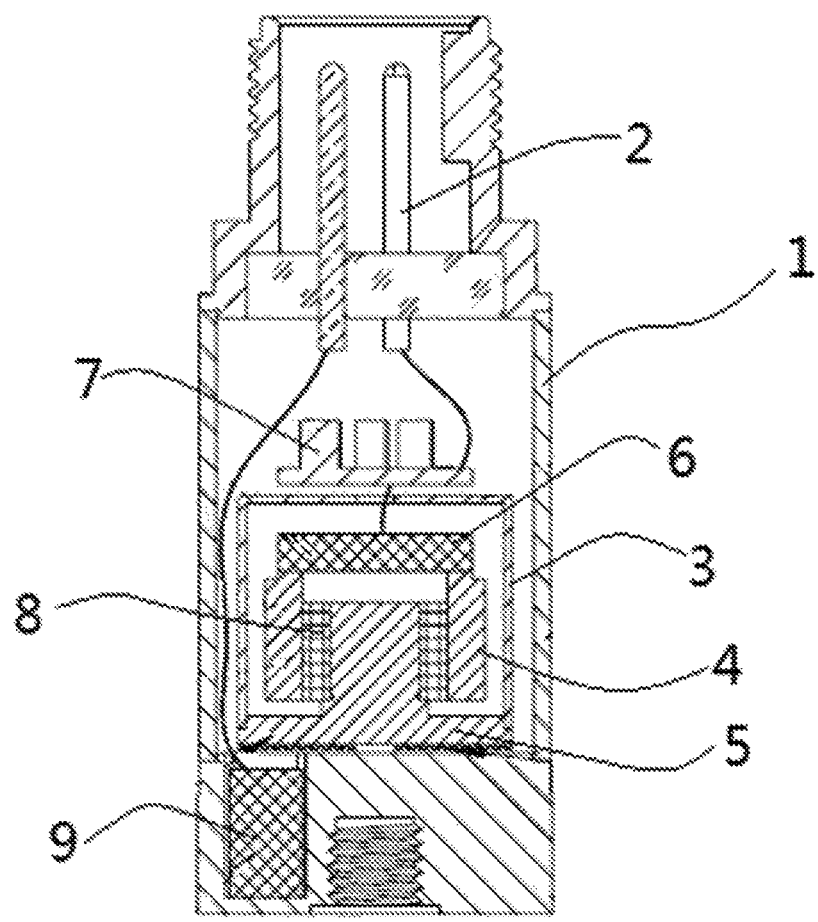

LIGHTNING PROOF SENSOR

TECHNICAL FIELD

The present application relates to the technical field of sensors, in particular to a lightning proof sensor.

BACKGROUND

Sensors are widely used industrial components, and mainly used to detect pressure, distance, temperature and other parameters of apparatus. At present, there are certain requirements for the lightning proof performance of the sensor in some outdoor applications, such as applications in the wind power apparatus.

A lightning proof sensor is described in an application patent application CN204142264U, and the lightning proof sensor comprises sensor housing, a sensor core unit and a connector. The connector comprises a connector housing and a pin that is fixed in the connector housing via a sealing member. The lightning proof sensor further comprises an insulation protective sleeve, and the connector is an enhanced insulation connector, the insulation protective sleeve is disposed in the sensor housing, and the sensor core unit is disposed in the insulation protective sleeve and completely wrapped in the insulation protective sleeve. The sensor core unit is connected to the pin in the connector housing through a through hole provided at an upper end of the insulation protective sleeve. By wrapping an insulation protective sleeve on a sensor core component, the insulation performance of the sensor is improved, and the lightning proof performance of the sensor is improved.

However, there still exist shortcomings in the actual trial application for the above lightning proof sensor. When the voltage is high enough, the insulation protective sleeve still has a certain possibility of being broken down under the electric field, causing a destructive discharge and damaging the sensor core component inside the insulation protective sleeve.

SUMMARY

Therefore, the technical problem to be solved by the present application is to overcome the defect that the sensor core component is still damaged when the lightning proof sensor of the prior art is subjected to a lightning stroke with a high voltage and further to provide a lightning proof sensor capable of resisting a stronger lightning stroke.

To this end, the present application provides the following technical solution:

A lightning proof sensor comprises:

a sensor housing, having a cavity;

a signal generation assembly, disposed in the cavity and forming insulation contact with an inner wall of the sensor housing;

a PIN needle, disposed on the connector and electrically connected with the signal generation assembly; and further comprises:

a shielding case, installed between the signal generation assembly and the sensor housing, and covering the signal generation assembly inside the shielding case, wherein, the shielding case forms insulation contact with the signal generation assembly and the sensor housing.

As a preferred technical solution, the lightning proof sensor further comprises:

a lightning proof circuit board, disposed in the sensor housing and forms insulation contact with the shielding case and the inner wall of the sensor housing, wherein the signal generation assembly is electrically connected to the PIN needle through the lightning proof circuit board.

As a preferred technical solution, the signal generation assembly comprises a temperature-current conversion component and a pressure-current conversion component.

As a preferred technical solution, the pressure-current conversion component comprises:

a cradle, insulated from and installed in the sensor housing and having a columnar protrusion;

a piezoelectric ceramic, which is annular and is sleeved on the columnar protrusion of the cradle;

a weight member, installed on an outer circumference of the piezoelectric ceramic, and electrically connected to the PIN needle through a pressure signal conditioning circuit board.

As a preferred technical solution, the temperature-current conversion component is a thermistor.

As a preferred technical solution, the thermistor is installed within the sensor housing and located near the outer surface of the housing.

As a preferred technical solution, the pressure signal conditioning circuit board is bonded to a top of the weight member by a conductive adhesive, and the weight member is bonded to the outer circumference of the piezoelectric ceramic layer by the conductive adhesive.

As a preferred technical solution, the PIN needle is fixed to the sensor housing by glass.

As a preferred technical solution, the cavity of the sensor housing is filled with insulating adhesive.

The technical solution of the application has the following advantages:

1. The sensor provided by the application comprises a sensor housing, a signal generation assembly, a PIN needle and a shielding case. The sensor housing has a cavity; the signal generation assembly is disposed in the cavity and forms insulation contact with the inner wall of the sensor housing; the PIN needle is disposed on the sensor housing, and the PIN needle is electrically connected to the signal generation assembly; and the shielding case is installed between the signal generation assembly and the sensor housing, covering the signal generation assembly, and the shielding case forms insulation contact with the signal generation assembly and the sensor housing.

In the above structure, on one hand, sensor housing can provide a first protection to a current generation component wrapped in the sensor housing, and when a first insulation protective sleeve is subjected to a stronger lightning proof, the shielding case provides a second protection to prevent internal current generation components from being damaged by breakdown. At the same time, when the sensor is applied in an environment with strong electromagnetic interference, the shielding case can also block the external electromagnetic interference steadily and ensure the performance stability of the sensor. Therefore, the sensor of the application can provide a better lightning proof effect than a conventional lightning proof sensor.

2. The sensor provided by the application further comprises a lightning proof circuit board disposed in the sensor housing, and forming insulation contact with the shielding case and the inner wall of the sensor housing. The signal generation assembly is electrically connected to the PIN needle through the lightning proof circuit board. The main components of the lightning proof circuit board comprise a TVS tube, a gas discharge tube and a resistor. The TVS tube is used to restrain the surge voltage to 22V. The gas discharge tube is used to absorb a large current capacity, and the resistor is used to absorb a residual voltage. The lightning proof circuit board can provide a third protection for the signal generation assembly. After part of the current penetrates the sensor housing and the shielding case to reach the signal generation assembly, the lightning proof circuit board can refrain and absorb the lightning current, avoiding damage to the sensor. Therefore, the above structure further improves the lightning proof performance of the sensor.

3. In the sensor provided by the present application, the signal generation assembly comprises a temperature-current conversion component and a pressure-current conversion component. The sensor can simultaneously detect the temperature and the pressure through the temperature-current conversion component and the pressure-current conversion component, so that more parameters of the apparatus can be detected, and the sensor has more comprehensive function.

4. In the sensor provided by the present application, the pressure-current conversion component comprises a cradle, a piezoelectric ceramic, and a weight member. The cradle is insulated from and installed in the sensor housing and has a columnar protrusion; the piezoelectric ceramic is annular and is sleeved on the columnar protrusion of the cradle; the weight member is installed on an outer circumference of the piezoelectric ceramic, and electrically connected to the PIN needle through a signal conditioning circuit board. Through the above structure, when the sensor detects an acceleration speed, a pressure is transmitted to the piezoelectric ceramic through the weight member, and the piezoelectric ceramic produce a current by a shearing effect, and then an acceleration state of the apparatus can be obtained by monitoring the current. Therefore, the above structures can make the pressure-current conversion component detect the acceleration state of the apparatus.

5. In the sensor provided by the present application, the thermistor is installed in the sensor housing and located adjacent to the outer surface of the housing. This arrangement of the thermistor causes the temperature that the thermistor is subjected to be much closer to the external environment temperature of the sensor, which improves the accuracy of the temperature measured by the sensor.

6. In the sensor provided by the present application, the cavity of the sensor housing is filled with insulating adhesive. By filling the insulating rubber into an insulation case, the insulation and pressure resistance performances of the sensor can be ensured, so that the sensor has superior environmental adaptability.

In summary, the sensor provided by the application has better lightning proof performance, and can simultaneously detect two parameters comprising temperature and acceleration speed, so that it has better environmental adaptability.

BRIEF DESCRIPTION OF THE DRAWINGS

In order to illustrate the Embodiments of the present application or the technical solutions in the prior art more clearly, the drawings used in the Embodiments or the description of the prior art will be briefly described below. Obviously, the drawings in the description below represent some embodiments of the present application, and those skilled in the art can obtain other drawings based on these drawings without paying any creative intellectual work.

FIG. 1 is a cross-sectional structural view of a sensor of Embodiment 1 of the present application;

REFERENCE SIGNS 1. sensor housing; 2. PIN needle; 3. shielding case; 4. weight member; 5. cradle; 6. pressure signal conditioning board; 7. lightning proof circuit board; 8. piezoceramic ceramic; 9. temperature-current conversion component

DETAILED DESCRIPTION

The technical solutions of the present application will be described clearly and completely in combination with the drawings. It is obvious that the described embodiments only represent part, but not all of the embodiments of the present application. All the other embodiments made by those skilled in the art based on the embodiments of the present application without paying any creative intellectual efforts fall within the scope of the present application.

In the description of the present application, it should be noted that the orientation or positional relationship indicated by those terms comprising "center", "upper", "lower", "left", "right", "vertical", "horizontal", "inside", "outside" are based on the orientation or positional relationship shown in the drawings, and are merely for the convenience of describing the present application and simplifying description, and are not intend to indicate or imply that the apparatus or component referred to has a specific orientation and to be constructed and operated in a specific orientation, therefore, these terms are not to be construed as limiting the application. Moreover, the terms "first," "second," and "third" are only for descriptive purposes and are not to be construed as indicating or implying relative importance.

In the description of the present application, it should be noted that the terms "install", "connect", and "couple" should be understood broadly, for example, a connection may be a fixed connection or a removable connection or an integral connection; a mechanical connection or an electrical connection; a direct connection or an indirect connection through an intermediate medium, or an internal communication between the two elements. The specific meanings of the above terms in the present application can be understood by those skilled in the art according to specific situation.

Further, the technical features involved in the different embodiments of the present application described below may be combined with each other as long as they do not constitute a conflict with each other.

EXAMPLE 1

FIG. 1 shows the Embodiment 1 of the present application. Embodiment 1 shows a lightning proof sensor, which has better lightning proof performance than a conventional lightning proof sensor.

The lightning proof sensor of Embodiment 1 comprises a sensor housing 1, a signal generation assembly, a PIN needle 2, and a shielding case 3. The sensor housing 1 has a cavity, and the sensor housing 1 is specifically made of a PVDF heat shrinkable sleeve, one end of the sensor housing 1 is provided with a stainless steel connector, a PIN needle 2 is installed inside the connector, and a is used between a PIN needle 2 is connected to the connector through a sintered glass.

The signal generation assembly is disposed in the cavity, and insulating adhesive is filled between the signal generation assembly and the inner wall of the sensor housing 1; the PIN needle 2 and the signal generation assembly are electrically connected; the shielding case 3 is installed between the signal generation assembly and the sensor housing 1 and covers the signal generation assembly, and the insulating adhesive is filled among the shielding case 3, the signal generation assembly and the sensor housing 1.

In order to further improve the lightning proof performance of the sensor, the lightning proof sensor of Example 1 further comprises a lightning proof circuit board 7 disposed in the sensor housing 1 and arranged above the shielding case 3. Insulating adhesive is filled in the space around the lightning proof circuit board 7, and the signal generation assembly is electrically connected to the PIN needle 2 through the lightning proof circuit board 7. The main components of the lightning proof circuit board 7 comprise a TVS tube, a gas discharge tube and a resistor. The TVS tube is used to restrain the surge voltage to 22V. The gas discharge tube is used to absorb a large current capacity, and the resistor is used to absorb a residual voltage. The lightning proof circuit board 7 can provide a third protection for the signal generation assembly. After part of the current penetrates the sensor housing and the shielding case to reach the signal generation assembly, the lightning proof circuit board 7 can refrain and absorb the lightning current, avoiding damage to the sensor. Therefore, the above structure further improves the lightning proof performance of the sensor.

In this embodiment, the signal generation assembly comprises a temperature-current conversion component 9 and a pressure-current conversion component. The pressure-current conversion component comprises a cradle 5, a piezoelectric ceramic 8, and a weight member 4. The cradle 5 is insulated from and installed in the sensor housing 1 and has a columnar protrusion; the piezoelectric ceramic 8 is annular, and is installed on the columnar protrusion of the cradle 5 through a conductive silver adhesive and a structural adhesive; the weight member 4 is installed on the outer circumference of the piezoelectric ceramic 8 through a conductive silver adhesive and a structural adhesive, and the weight member 4 is electrically connected to the PIN needle 2 through the pressure signal conditioning circuit board 6. When the sensor detects an acceleration speed, a pressure is transmitted to the piezoelectric ceramic 8 through the weight member 4, and the piezoelectric ceramic 8 generates a current by a shearing effect, and then an acceleration state of the apparatus can be obtained by monitoring the current. The temperature-current conversion component 9 comprises a thermistor installed within the sensor housing 1 and located adjacent to the outer surface of the housing and a temperature signal conditioning circuit board. Specifically, a recess is formed at the bottom of a sensor insulating housing, and the temperature-current conversion component 9 is placed in the recess and then the recess is filled with a high temperature thermal conductive adhesive. This temperature measuring structure has the following characteristics comprising small volume and short temperature response time.

The above temperature signal conditioning circuit board mainly comprises a temperature acquisition chip, a stabilivolt and a resistor capacitor component. The sensor is powered by a 4 MA constant current source, and a voltage of 4.5V can be obtained through the stabilivolt to supply power to the temperature acquisition chip. The temperature acquisition chip is a voltage output type with a resolution of 10 mv/C°. The pressure signal conditioning circuit board 6 mainly comprises a field effect transistor, a triode, a stabilivolt and a resistor capacitor component. The sensor is powered by a 4 MA constant current source. By using a stabilivolt and a field effect transistor, a bias of about 12.5V can be generated, which forms a DC path. An AC path is amplified by the FET and used to reduce the output impedance by an emitter follower connected from triodes and improve the load capacity.

The principles of the above sensors are as follows:

The sensor housing 1 can provide a primary protection to a current generation component wrapped in the sensor housing 1, and when a insulation protective sleeve for providing the primary protection is subject to a stronger lightning stroke, the shielding case 3 provides a secondary protection to prevent internal current generation components from being damaged by breakdown. At the same time, when the sensor is applied in an environment with strong electromagnetic interference, the shielding case 3 can also block the external electromagnetic interference steadily and ensure the performance stability of the sensor. Therefore, the sensor of the application can provide a better lightning proof effect than a conventional lightning proof sensor.

It is obvious that the above examples are merely for clear illustration of the examples, and are not intended to limit the examples. Other variations or modifications of the various forms may be made by those skilled in the art in light of the above description. There is no need and no way to exhaust all of the embodiments, and obvious changes or variations derived therefrom still fall within the scope of the present application.

The invention claimed is:

1. A lightning proof sensor comprising:
   a sensor housing, having a cavity and provided with a connector at one end;
   a signal generation assembly, disposed in the cavity and forming insulation contact with an inner wall of the sensor housing;
   a PIN needle, disposed on the connector and electrically connected with the signal generation assembly; and
   further comprising:
   a shielding case, installed between the signal generation assembly and the sensor housing, and covering the signal generation assembly inside the shielding case,
   wherein, the shielding case forms insulation contact with the signal generation assembly and the sensor housing, and further wherein the shielding case blocks external electromagnetic interference steadily and ensures performance stability of the sensor.

2. The lightning proof sensor according to claim 1, further comprising:
   a lightning proof circuit board, disposed in the sensor housing and forming insulation contact with the shielding case and the inner wall of the sensor housing, wherein the signal generation assembly is electrically connected to the PIN needle through the lightning proof circuit board.

3. The lightning proof sensor according to claim 1, wherein the signal generation assembly comprises a temperature-current conversion component and a pressure-current conversion component.

4. The lightning proof sensor according to claim 3, wherein the pressure-current conversion component comprises:
   a cradle, insulated from and installed in the sensor housing and having a columnar protrusion;
   a piezoelectric ceramic, which is annular and is sleeved on the columnar protrusion of the cradle;
   a weight member, installed on an outer circumference of the piezoelectric ceramic, and electrically connected to the PIN needle through a pressure signal conditioning circuit board.

5. The lightning proof sensor according to claim 3, wherein the temperature-current conversion component is a thermistor.

6. The lightning proof sensor according to claim 5, wherein the thermistor is installed within the sensor housing and located near an outer surface of the housing.

7. The lightning proof sensor according to claim 4, wherein the pressure signal conditioning circuit board is bonded to a top of the weight member by a conductive adhesive, and the weight member is bonded to the outer circumference of the piezoelectric ceramic layer by the conductive adhesive.

8. The lightning proof sensor according to claim 1, wherein the PIN needle is fixed to the sensor housing by glass.

9. The lightning proof sensor according to claim 1, wherein, the cavity of the sensor housing is filled with insulating adhesive.

10. The lightning proof sensor according to claim 2, wherein, the cavity of the sensor housing is filled with insulating adhesive.

11. The lightning proof sensor according to claim 3, wherein, the cavity of the sensor housing is filled with insulating adhesive.

12. The lightning proof sensor according to claim 4, wherein, the cavity of the sensor housing is filled with insulating adhesive.

13. The lightning proof sensor according to claim 5, wherein, the cavity of the sensor housing is filled with insulating adhesive.

14. The lightning proof sensor according to claim 6, wherein, the cavity of the sensor housing is filled with insulating adhesive.

15. The lightning proof sensor according to claim 7, wherein, the cavity of the sensor housing is filled with insulating adhesive.

16. The lightning proof sensor according to claim 8, wherein, the cavity of the sensor housing is filled with insulating adhesive.

* * * * *